United States Patent
Wright et al.

(10) Patent No.: US 11,941,381 B2
(45) Date of Patent: Mar. 26, 2024

(54) METHOD FOR COMPILING FROM A HIGH-LEVEL SCRIPTING LANGUAGE TO A BLOCKCHAIN NATIVE SCRIPTING LANGUAGE

(71) Applicant: nChain Licensing AG, Zug (CH)

(72) Inventors: Craig Steven Wright, London (GB); Stephane Savanah, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 18/101,977

(22) Filed: Jan. 26, 2023

(65) Prior Publication Data

US 2023/0246811 A1 Aug. 3, 2023

Related U.S. Application Data

(63) Continuation of application No. 16/629,287, filed as application No. PCT/IB2018/054970 on Jul. 5, 2018, now Pat. No. 11,797,278.

(30) Foreign Application Priority Data

| Jul. 7, 2017 | (GB) | ..................................... 1710967 |
| Jul. 7, 2017 | (GB) | ..................................... 1710971 |

(Continued)

(51) Int. Cl.
*G06F 21/00* (2013.01)
*G06F 8/30* (2018.01)
(Continued)

(52) U.S. Cl.
CPC ............... *G06F 8/433* (2013.01); *G06F 8/31* (2013.01); *G06F 8/41* (2013.01); *G06F 8/443* (2013.01);
(Continued)

(58) Field of Classification Search
None
See application file for complete search history.

(56) References Cited

U.S. PATENT DOCUMENTS

| 5,761,652 A | 6/1998 | Wu et al. |
| 6,760,905 B1 | 7/2004 | Hostetter et al. |

(Continued)

FOREIGN PATENT DOCUMENTS

| CN | 106598549 A | 4/2017 |
| CN | 106598579 A | 4/2017 |

(Continued)

OTHER PUBLICATIONS

Author: Dan Robinson; Title: "Ivy: A Declarative Predicate Language for Smart Contracts"; Date: Jan. 26, 2017, Source: Internet: https://diyhpl.us/wiki/transcripts/blockchain-protocol-analysis-security-engineering/2017/2017-01-26-dan-robinson-ivy/ (Year: 2017).*

(Continued)

*Primary Examiner* — Andrew J Steinle
(74) *Attorney, Agent, or Firm* — Davis Wright Tremaine LLP

(57) ABSTRACT

The invention provides methods and systems which enable additional functionality to be inserted into blockchain scripts with ease and in an effective and manner. According to one embodiment, the invention provides a blockchain-implemented method comprising the steps of arranging a plurality or selection of scripting language primitives to provide, upon execution, the functionality of a high-level scripting language primitive, wherein the scripting language is associated with a blockchain protocol; inserting the plurality of scripting language primitives at least once into a script; and inserting the script into blockchain transaction (Tx). The high-level scripting language primitive may perform, for example, an arithmetic operation such as multiplication or division. The scripting language primitives may be called (Continued)

Control transaction

| <Transaction Name> | |
|---|---|
| Tx1 | Transaction-ID |
| Version Number | Version number |
| 1 | Number of inputs |
| Previous Tx | Prev Trans Output |
| 0 | Prev Trans Output index |
| Script length | Script length |
| <company's signature> <company's public key> | ScriptSig |
| SIGHASH_ALL | ScriptSig |
| Sequence number | Sequence number |
| 1 | Number of Outputs |
| <few satoshis> | Output value |
| Output Script Length | Output script length |
| OP_2 <sensor1's public key> <sensor2's public key> OP_2 OP_CHECKMULTISIG OP_DROP Pro_MULT OP_FROMALSTACK <$W_t$> OP_GREATERTHAN OP_IF <state$_2$> OP_ELSE <state$_1$> OP_ENDIF | Output script |
| LockTime | LockTime | op-codes, words or commands, and are native to the scripting language. The scripting language may be Script, and the blockchain protocol may be a version of the Bitcoin protocol.

8 Claims, 3 Drawing Sheets

(30) Foreign Application Priority Data

| Jul. 7, 2017 | (GB) | ................................. 1710974 |
| Jul. 7, 2017 | (WO) | ................. PCT/IB2017/054110 |
| Jul. 7, 2017 | (WO) | ................. PCT/IB2017/054113 |
| Jul. 7, 2017 | (WO) | ................. PCT/IB2017/054114 |

(51) Int. Cl.
　　*G06F 8/41*　　　(2018.01)
　　*G06F 8/51*　　　(2018.01)
　　*H04L 9/06*　　　(2006.01)
　　*H04L 9/32*　　　(2006.01)
　　*H04L 9/00*　　　(2022.01)

(52) U.S. Cl.
　　CPC ............... *G06F 8/452* (2013.01); *G06F 8/51* (2013.01); *H04L 9/0618* (2013.01); *H04L 9/0637* (2013.01); *H04L 9/0643* (2013.01); *H04L 9/3247* (2013.01); *H04L 9/3297* (2013.01); *H04L 9/50* (2022.05); *H04L 2209/56* (2013.01)

(56) References Cited

U.S. PATENT DOCUMENTS

| 9,569,206 | B1 | 2/2017 | Dawson et al. |
| 10,050,779 | B2 | 8/2018 | Alness et al. |
| 10,871,948 | B1 | 12/2020 | Dowling |
| 11,307,835 | B2 | 4/2022 | Wright et al. |
| 2003/0005404 | A1 | 1/2003 | Bowyer et al. |
| 2004/0015916 | A1 | 1/2004 | Click et al. |
| 2014/0068576 | A1 | 3/2014 | Pendap et al. |
| 2015/0007167 | A1 | 1/2015 | Mody et al. |
| 2015/0074655 | A1 | 3/2015 | de Lima Ottoni et al. |
| 2015/0149978 | A1 | 5/2015 | Kim |
| 2016/0274998 | A1 | 9/2016 | Coyle et al. |
| 2016/0330034 | A1 | 11/2016 | Back et al. |
| 2017/0287090 | A1 | 10/2017 | Hunn et al. |
| 2017/0300403 | A1 | 10/2017 | Ramraz |
| 2017/0300627 | A1 | 10/2017 | Giordano et al. |
| 2018/0293157 | A1 | 10/2018 | Dougherty et al. |
| 2018/0314938 | A1 | 11/2018 | Andoni et al. |
| 2019/0116024 | A1 | 4/2019 | Wright et al. |

FOREIGN PATENT DOCUMENTS

| JP | S61182138 | A | 8/1986 |
| WO | 2006107339 | A | 4/2006 |
| WO | 2017024071 | A1 | 2/2017 |
| WO | 2017027407 | A1 | 2/2017 |
| WO | 2017145006 | A1 | 8/2017 |
| WO | 2017187398 | A1 | 11/2017 |

OTHER PUBLICATIONS

Author: Dan Robinson; Title: "Ivy: A Declarative Predicate Language for Smart Contracts"; Date: Jan. 26, 2017, Slides (Year: 2017).*
Allison, "Jeff Garzik's Bloq runs smart contracts like an 'Ethereum plug-in for Bitcoin,'" International Business Times, May 25, 2016, https://www.ibtimes.co.uk/jeff-garziks-bloq-runs-smart-contracts-like-ethereum-plug-bitcoin-1561976, 5 pages.
Bedford, "How to code with Google Blockly," Tech Advisor, Jun. 12, 2014, https://web.archive.org/web/20170626164055/https://www.techadvisor.co.uk/how-to/software/how-code-with-google-blockly-3524675, 6 pages.
Bhargavan et al., "Formal Verification of Smart Contracts," Proceedings of the 2016 ACM Workshop on Programming Languages and Analysis for Security, Oct. 24, 2016, https://antoine.delignat-lavaud.fr/doc/plas16.pdf, 6 pages.
bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.
Ceejep et al., "Rfp-8: Higher Level Language Compiling To Transaction Script," Dec. 14, 2015, https://forum.decred.org/threads/rfp-8-higher-level-language-compiling-totransaction-script.3665/, 7 pages.
Chain, "Announcing Ivy Playground," Medium, May 17, 2017, https://web.archive.org/web/20170518000630/https://blog.chain.com/announcing-ivy-playground-395364675d0a, 12 pages.
Chen et al., "Under-Optimized Smart Contracts Devour Your Money," IEEE 24th International Conference on Software Analysis, Evolution and Reengineering (SANER), Feb. 20, 2017, https://arxiv.org/pdf/1703.03994.pdf, 5 pages.
Costill, "Bitcoin Scripting and How It Can Be Improved," Due, https://due.com/blog/bitcoin-scripting-and-how-it-can-be-improved/, Mar. 25, 2016, 16 pages.
Curiosity Driven, "Bitcoin contracts compiler," Sep. 6, 2014, https://github.com/curiosity-driven/bitcoin-contracts-compiler, 2 pages.
Curiosity Driven, "Bitcoin contracts," Apr. 8, 2016, https://curiosity-driven.org/bitcoin-contracts, 10 pages.
Curiosity Driven, "Superscript compiler," Sep. 6, 2014, https://github.com/curiosity-driven/bitcoin-contracts-compiler/commits/master, 1 page.
De Rosa, "A developer-oriented series about Bitcoin—Section 10: The Bitcoin Script language (pt. 1) and Section 11: The Bitcoin Script language (pt. 2)," May 25, 2015, https://davidederosa.com/basic-blockchain-programming/, 17 pages.
Etherscan, "ByteCode to Opcode Disassembler," Etherscan, the Ethereum Block Explorer, Aug. 2015, https://etherscan.io/address/0xafdacfee6395bc1e480a900943f1803f854bc20e, 3 pages.
Etherscan, "Contract Address—Transaction Example," Etherscan, the Etheruem Block Explorer, Oct. 20, 2016, 3 pages.
Etherscan, "Contract Address," Etherscan, the Etheruem Block Explorer, copyright 2017, https://etherscan.io/address/0x5a4964bb5fdd3ce646bb6aa020704f7d4db79302, 4 pages.
Exab et al., "Understanding the risk of BU (bitcoin unlimited)," Reddit, Feb. 22, 20217, https://www.reddit.com/r/Bitcoin/comments/5vo5wi/understanding_the_risk_of_bu_bitcoin_unlimited/, 27 pages.
FMLFPL111 et al., "It's there a solution to the scaling problem?," Reddit, Jan. 25, 2017, https://www.reddit.com/r/Monero/comments/5q3fcf/its_there_a_solution_to_the_scaling_problem/, 14 pages.
Frontier, "State Machine," Gitbooks, Mar. 15, 2017, https://ethereum.gitbooks.io/frontierguide/content/opcodes,_costs,_and_gas.html, 1 page.
Gitbook, "Ethereum Frontier Guide," Gitbook (Legacy), Feb. 4, 2016, 293 pages.
International Search Report and Written Opinion dated Aug. 30, 2018, Patent Application No. PCT/IB2018/054970, 13 pages.
International Search Report and Written Opinion dated Aug. 30, 2018, Patent Application No. PCT/IB2018/054971, 12 pages.
International Search Report and Written Opinion dated Mar. 23, 2018, Patent Application No. PCT/IB2017/054110, 13 pages.
International Search Report and Written Opinion dated Mar. 23, 2018, Patent Application No. PCT/IB2017/054113, 13 pages.
International Search Report and Written Opinion dated Sep. 3, 2018, Patent Application No. PCT/IB2018/054969, 13 pages.
Klmoney, "Part 1: Transaction Basics," Jun. 6, 2017, Wordpress, https://web.archive.org/web/20170606202729/https://klmoney.wordpress.com/bitcoin-dissecting-transactions-part-1/, 9 pages.
Klmoney, "Part 2: Building a Transaction By Hand," Wordpress, Jun. 7, 2017, https://web.archive.org/web/20170607015517/https://klmoney.wordpress.com/bitcoin-dissecting-transactions-part-2-building-a-transaction-by-hand/, 21 pages.

(56) References Cited

OTHER PUBLICATIONS

Kosba et al., "Hawk: The Blockchain Model of Cryptography and Privacy-Preserving Smart Contracts," IEEE Symposium on Security and Privacy, May 22, 2016, 31 pages.
Le Calvez, "A look at Bitcoin non-standard outputs," Medium, Nov. 8, 2015 [retrieved Feb. 28, 2017], https://medium.com/@alcio/a-look-at-bitcoin-non-standard-outputs-c97f65cccbb6#.3fw5ur52k, 6 pages.
Lerner, "RSK Rootstock Platform Bitcoin powered Smart Contracts White Paper version 9," Nov. 19, 2015, https://uploads.strikinglycdn.com/files/90847694-70f0-4668-ba7fdd0c6b0b00a1/RootstockWhitePaperv9-Overview.pdf, 24 pages.
Morgenstern, "Forth's Stacks," Forth.org, Nov. 14, 2016, https://web.archive.org/web/20161114030625/http://www.forth.org/svfig/Len/softstak.htm, 3 pages.
Nakamoto, "Bitcoin: A Peer-to-Peer Electronic Cash System," Bitcoin, Oct. 31, 2008, https://bitcoin.org/bitcoin.pdf, 9 pages.
Rensylvain et al., "Any truth to haveing turing complete programming worked into bitcoin via an OP code?," Reddit, Dec. 13, 2015, https://www.reddit.com/r/Bitcoin/comments/3wpkd0/any_truth_to_haveing_turing_complete_programming/, 14 pages.
Rios et al., "Derivative-free optimization: a review of algorithms and comparison of software implementations," Journal of Global Optimization 56(3):1247-93, Jul. 12, 2012.
Robinson, "Ivy: A Declarative Predicate Language for Smart Contracts," Chain, https://cyber.stanford.edu/sites/default/files/danrobinson.pdf, Jan. 2017, 30 pages.
Sarchar et al., "[ANNOUNCE] Whitepaper for Bitstorage—a peer to peer, cloud storage network," Bitcoin Forum, Nov. 27, 2013, https://bitcointalk.org/index.php?topic=348868.0, 10 pages.
Stevenroose et al., "IRC Chat Log Feb. 9, 2016," Bitcoin Wizards, Feb. 9, 2016, https://irclog.whitequark.org/bitcoin-wizards/2016-02-09, pages.
Tekknolagi et al., "How to implement LOOP in a FORTH-like language interpreter written in C," Stack Overflow, Aug. 4, 2011, https://web.archive.org/web/20150531001644/https://stackoverflow.com/questions/6949434/how-to-implement-loop-in-a-forth-like-language-interpreter-written-in-c, 4 pages.
UK Commercial Search Report dated Nov. 17, 2017, Patent Application No. GB1710974.5, 9 pages.
UK IPO Search Report dated Dec. 21, 2017, Patent Application No. GB1710967.9, 9 pages.
UK IPO Search Report dated Dec. 21, 2017, Patent Application No. GB1710971.1, 9 pages.
UK IPO Search Report dated Dec. 21, 2017, Patent Application No. GB1710974.5, 9 pages.
Wikipedia, "Proof of space," Wikipedia the Free Encyclopedia, Jul. 11, 2017, https://en.wikipedia.org/w/index.php?title=Proof-of-space&oldid=790069182, 5 pages.
Willis et al., "TX Script—Documentation," GitHub, Jun. 27, 2016, https://github.com/Kefkius/txsc/blob/master/doc/txscript.asciidoc, 8 pages.
Willis et al., "TX Script—History," GitHub, Jun. 27, 2016, https://github.com/Kefkius/txsc/commits/master/doc/txscript.asciidoc, 2 pages.
Willis et al., "TX Script," GitHub, Jun. 27, 2016, https://github.com/Kefkius/txsc, 3 pages.
Zyskind, "Efficient secure computation enabled by blockchain technology," Doctoral dissertation, Massachusetts Institute of Technology, Jun. 2016, https://pdfs.semanticscholar.org/5b54/7a7f2e47af79429d9467701538434d8e6bcb.pdf, 128 pages.
Antonopoulos, "Mastering Bitcoin—Unlocking Digital Cryptocurrencies," O'Reilly Media, Inc., Dec. 20, 2014, 282 pages.
Satoshi et al., "Connection Limits," Bitcoin Forum, Aug. 9, 2010, https://bitcointalk.org/index.php?topic=741.0;prev_next=prev, 2 pages.
International Search Report and Written Opinion dated Mar. 23, 2018, Patent Application No. PCT/IB2017/054114, 14 pages.
Anonymous: "Announcing Ivy Playground—Chain", May 18, 2017, 15 pages.
Anonymous: "Part 1: Transaction Basics Crypto Tokens", Jun. 6, 2017, https:/web.archive.org/web/2017060202729/https://klmoney.wordspress.com/bitcoin-dissecting-transactions-part1, 16 pages.
Anonymous: "Part 2: Building a Transaction By Hand, Crypto Tokens", Jun. 7, 2017, 18 pages.
Solidity in Depth, "Expressions and Control Structures" Input Parameters and Output Parameters, Jul. 3, 2017, https://docs.huihoo.com/ethereum/solidity/control-structures.html, 10 pages.
github.com, "EVM OPCODE Gas Costs", https://github.com/djrtwo/evm-opcode-gas-costs, Apr. 12, 2017, 2 pages.

* cited by examiner

Figure 2

Control transaction

| <Transaction Name> | |
|---|---|
| Tx1 | Transaction-ID |
| Version Number | Version number |
| 1 | Number of inputs |
| Previous Tx | Prev Trans Output |
| 0 | Prev Trans Output index |
| Script length | Script length |
| <company's signature> <company's public key> | ScriptSig |
| SIGHASH_ALL | ScriptSig |
| Sequence number | Sequence number |
| 1 | Number of Outputs |
| <few satoshis> | Output value |
| Output Script Length | Output script length |
| OP_2 <sensor1's public key> <sensor2's public key> OP_2 OP_CHECKMULTISIG OP_DROP Pro_MULT OP_FROMALSTACK <$W_t$> OP_GREATERTHAN OP_IF <$state_2$> OP_ELSE <$state_1$> OP_ENDIF | Output script |
| LockTime | LockTime |

METHOD FOR COMPILING FROM A HIGH-LEVEL SCRIPTING LANGUAGE TO A BLOCKCHAIN NATIVE SCRIPTING LANGUAGE

CROSS-REFERENCE TO RELATED APPLICATIONS

This application is a continuation of U.S. patent application Ser. No. 16/629,287, filed Jan. 7, 2020, entitled "METHOD FOR COMPILING FROM A HIGH-LEVEL SCRIPTING LANGUAGE TO A BLOCKCHAIN NATIVE SCRIPTING LANGUAGE," which is a 371 of International Patent Application No. PCT/M2018/054970, filed Jul. 5, 2018, which claims priority to United Kingdom Patent Application No. 1710971.1, filed Jul. 7, 2017, United Kingdom Patent Application No. 1710974.5, filed Jul. 7, 2017, United Kingdom Patent Application No. 1710967.9, filed Jul. 7, 2017, International Patent Application No. PCT/IB2017/054110, filed Jul. 7, 2017, International Patent Application No. PCT/IB2017/054113, filed Jul. 7, 2017, and International Patent Application No. PCT/IB2017/054114, filed Jul. 7, 2017, the disclosures of which are hereby incorporated herein in their entirety.

BACKGROUND

This invention relates generally to distributed ledger technologies, and more particularly to blockchain technologies such as a variant of the Bitcoin blockchain or any other blockchain/cryptocurrency protocol. The invention is particularly suited, but not limited to, use in controlling the way in which a script in a blockchain transaction (Tx) is arranged to execute and, therefore, controlling the manner in which control or ownership of a digital resource is transferred via the blockchain network.

SUMMARY

In this document we use the term 'blockchain' to include all forms of electronic, computer-based, distributed ledger technologies. These include consensus-based blockchain and transaction-chain technologies, permissioned and un-permissioned ledgers, shared ledgers, side chains and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with a variant of the Bitcoin blockchain and alternative blockchain implementations and protocols fall within the scope of the present invention.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language called Script.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency, thus expanding the applicability of blockchain-implemented technologies. Such solutions would be able to harness the benefits of the blockchain (e.g. a permanent, tamper proof records of events, distributed processing etc) while being more versatile in their applications.

However, in order to increase the functionality of such technologies, there is a need to address some technical limitations which currently exist. In one or more Bitcoin protocols, for example, certain operators may not be available for programmers to use when writing their programs in Script. Security-related concerns caused some of the Script opcodes which were provided in the original version of the protocol to be disabled by the Bitcoin community. These include operators for carrying out certain arithmetic operations such as multiplication and division. Currently, therefore, in some protocols there is no native mechanism for performing such operations within Script, and this leads to a restriction in what the scripting code can currently achieve. Any script which contains a disabled opcode will fail and abort. This results in a limitation on the functionality of technologies which are implemented on such an underlying blockchain protocol. There is a technical challenge that arises when a desired implementation needs to use functionalities which are not provided within the underlying protocol. Changing the protocol may not always be desirable or feasible. Meanwhile, such blockchain platforms remain functionally restricted.

Therefore, while there remains a desire to preserve the security and integrity of blockchain scripting languages, there is also a need to provide a solution which gives more programming power to the script programmers, and increases the versatility, usability and applicability of the language. Such a solution would provide an improved blockchain network. Numerous benefits may flow from this including but not limited to:

Enabling the automation of complex blockchain-related transfers;
  Controlling the metadata stream that is recorded onto the Blockchain Extending the functionality and applications of blockchain-implemented technologies An example of such a solution is provided herein.

In accordance with the present invention there is provided a system and/or method as defined in the appended claims.

Embodiments of the invention may provide a blockchain-implemented method/system. The invention may be a control method/system. It may be arranged to control the execution of a script which is embedded in a blockchain transaction (Tx), and/or whether an output is unlocked, and/or control the transfer of a resource (e.g. a portion of cryptocurrency) from one entity to another via the transaction.

The blockchain may be associated with a protocol and a scripting language. The scripting language may be a stack-based language. The scripting language may be functionally restricted in the sense that it may not permit complex control flow mechanisms such as loops and/or jump recursion. This may be the Bitcoin scripting language, Script, or an alternative.

Embodiments of the invention may provide a mechanism for emulating or implementing the functionality of an operation in a blockchain script. The operation may be an operation which is not natively supported by the scripting language associated with the blockchain protocol. It may be a disabled operation. It may be referred to as a high-level operation. It may be high level relative to the word set (opcodes, commands, instructions or functions) of the blockchain scripting language. The high-level operation may be one which functions at a level abstraction that is removed from the native, primitive operations or op-codes which are native to the language. The high-level operation may be an arithmetic operation such as multiplication and division. An advantage of this is that the invention can be used to write scripts which incorporate this functionality in a convenient manner, without the need to modify the scripting language or blockchain protocol. Thus, the invention provides an improved blockchain system in that more functionally complex, enabling more functionally diverse applications to be executed upon the blockchain; and enabling programming of the applications to be achieved more easily and quickly, with a reduction in errors. The result is, therefore, a more versatile, functionally powerful and useful blockchain. In turn, this enables more blockchain-implemented technologies to be built.

Additionally or alternatively, the method may comprise the steps:

arranging a plurality of a (blockchain) scripting language primitives to provide, upon execution, the functionality of a high-level scripting language primitive; the scripting language may be associated with a blockchain protocol;

inserting the plurality of scripting language primitives at least once into a script; and/or inserting the script into blockchain transaction (Tx).

Additionally or alternatively, a method in accordance with the invention may comprise:

storing a plurality of blockchain op_codes (primitives) which have been arranged and/or selected to perform the functionality of a high-level scripting language operator;

retrieving the plurality of op_codes from storage;

inserting said plurality of op_codes into a script in a blockchain transaction.

The plurality of op_codes may be described as a "chunk".

The method may comprise the step of validating the transaction and/or submitting it to the blockchain network. It may comprise the step of executing the transaction.

Each of the plurality of scripting language primitives may also be known as a word, opcode, command, or function. They may be referred to as "low-level primitives". For sake of convenience, the term "op-code" will be used for "scripting language primitive". One, some or all of the plurality of op_codes may be selected from the word or instruction set of the scripting language. They may be native to the scripting language.

The high-level scripting language primitive may be a group or selection of arranged opcodes. They may be deliberately arranged to provide the desired, abstracted functionality. It may be referred to as a "high-level primitive" for ease of reference. The high-level primitive may perform an arithmetic operation, or data copying, logical, or program (flow) control operation. It may produce a result which is left in a computer's memory on a stack. The high-level primitive may emulate or provide the functionality of an op_code which is not included in the native word set of the language, or has been disabled. The high-level primitive may be "high-level" in the sense that it can be decomposed into more elementary or basic operations which are native to the language and/or perform functionally simpler operations. The high level primitive may be composed of so as to perform a single operation or produce a result, but at a more abstracted level than the op_codes.

The scripting language may be the Script language. The blockchain protocol may be the Bitcoin protocol. However, other languages and protocols may fall within the scope of the present invention. The scripting language may be functionally restricted. The term "non-Turing complete" may be used herein interchangeably with the term "functionally restricted". The language may be functionally restricted in the sense that it does not natively support one or more control flow mechanisms such as loops and/or recursive jumps.

The method may further comprise the step of selecting one, some or all of the plurality of scripting language primitives from a word set or instruction set of the scripting language.

The method may further comprise the step of saving and/or storing the plurality of scripting language primitives in or on a computer-based storage resource. This may be non-volatile computer memory. The method may further comprise the step of retrieving the plurality of scripting language primitives from a computer-based storage resource prior to inserting it into the script.

The script may be an unlocking script, locking script or redeem script.

The script is inserted into the blockchain transaction (Tx) in association with an input or output of the blockchain transaction.

The method may further comprise the step of receiving an input or signal from a source and using the input or signal to control the number of times that the plurality of scripting language primitives is inserted into a script.

The method may further comprise the step of submitting the transaction to a blockchain network.

The plurality of scripting language primitives is inserted into a template script and/or template transaction (Tx). The template may be an incomplete version of the script/transaction.

The invention also provides a computer-implemented system. The system may be arranged to perform any embodiment of the method described above. Any feature described in relation to one or more aspect of the invention may also be applicable to any other aspect. Any feature described in relation to the method may also be applicable to a corresponding system and vice versa.

The invention also provides a system, comprising:
a processor; and
memory including executable instructions that, as a result of execution by the processor, causes the system to perform any embodiment of the computer-implemented method described herein.

The invention also provides a non-transitory computer-readable storage medium having stored thereon executable instructions that, as a result of being executed by a processor of a computer system, cause the computer system to at least perform an embodiment of the computer-implemented method described herein.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which:

FIG. 2 shows a control transaction which is suitable for use in accordance with an embodiment of the invention, and in relation to an illustrative use case.

DETAILED DESCRIPTION

Illustrative Embodiment of the Invention

Figure 1:
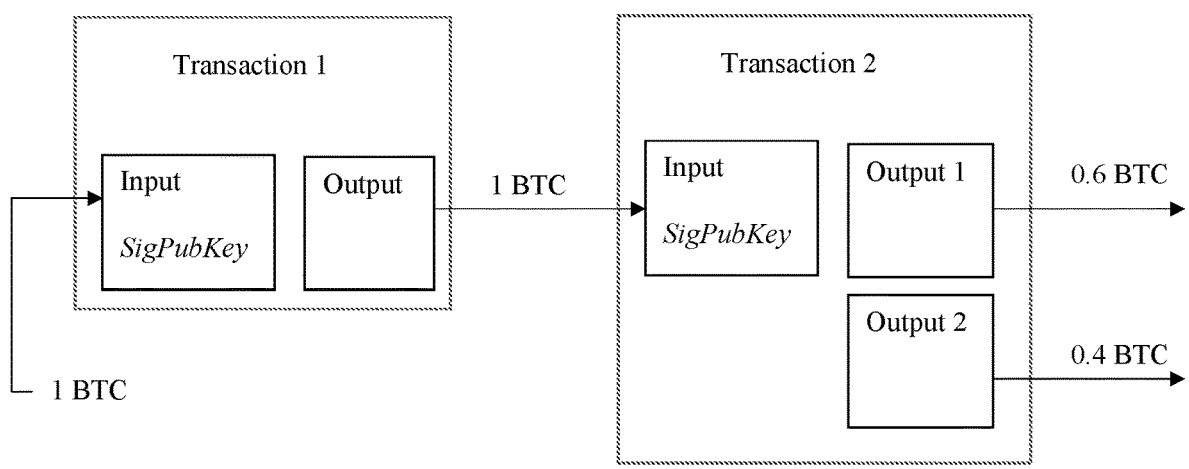
FIG. 1 illustrates how transactions can be chained together on a blockchain to transfer control of ownership of some cryptocurrency, as is known in the prior art.

The invention provides an improved mechanism for implementing the functionality of high level operations in a blockchain script, even when the scripting language of the blockchain's associated protocol does not provide native op_codes for such a high-level operation, or they have been disabled. The invention utilises a selection of the language's existing, low-level op_codes and combines them in an inventive way to achieve the desired functionality. The selected combination of primitive op_codes are selected and/or arranged so as to provide the desired high-level functionality. The combination of selected native op_codes may be referred to as "high level operators" for the sake of convenience and ease of reference. Thus, the term "high level" may be used to mean that operation can be decomposed into more rudimentary or basic operations, preferably which are native to the scripting language. The plurality or chunk of op_codes may be associated with a label or identifier for ease of reference, usage or invocation.

The portion of code which makes up the high level operator may be predefined or pre-selected. "pre", in this context, may mean in advance of the end use or application to which the portion of code is ultimately put. Additionally or alternatively, it may mean in advance of execution or run-time. The portion of code (or "chuck") is stored on a computer-based resource such as non-volatile memory. When a script is needed for a given purpose, the stored operator can be accessed, copied and inserted into a script at one or more chosen locations so as to provide the desired control and functionality at execution time. The script into which the high-level operator is inserted may be a template that is access from storage. Thus, a functionally complex blockchain transaction can be generated in a convenient and swift manner, saving programming time, effort and reducing the possibility of coding errors. By reducing the possibility of errors, the invention provides a mechanism for ensuring the quality of code used for blockchain transactions. This, in turn, reduces the number of script (and thus transaction) failures at run time. In this sense, the invention provides a more efficient and error-reduced solution for executing a transaction on a blockchain, and performing a transfer from one party to another via the output of one transaction to the input of s second transaction.

At run time, one or more signals or inputs can be received from a source, and the input(s) can be used to influence or control the number of times that the high-level operator is used within the script. In certain embodiments, the input(s) are received from sensor(s). Thus, the script can be generated such that the result is calculated in response to some external or environmental factor(s).

Another advantage is that the design, implementation or deployment of the existing scripting language does not need to be amended or altered in any way; the functionality of disabled or non-implemented primitive operators can be provided for with ease and without disruption to the blockchain protocol in its current form.

Hereafter, we present solutions in accordance with embodiments of the invention that allow for emulation of high-level multiplication and division operators. These embodiments comprise a Script-based sequence of operations which provide the desired functionality and behaviour of the operators. This the operators provide mechanisms for controlling how a blockchain-implemented program will execute. As these programs are embedded into the inputs and outputs of blockchain transactions (Txs), they therefore provide a mechanism which influences and controls how transactions will be carried out, and thus transfer control of ownership of cryptocurrency from one party to another.

Example—Multiplication

In this embodiment, we provide a mechanism for multiplication in a blockchain script. This exploits the knowledge that a multiplication is Let X and Y be the values that we wish to multiply. Written in the syntax of the Script language, the multiplication operator becomes:

```
OP_X OP_Y
OP_2DUP OP_GREATERTHAN
OP_NOTIF
    OP_SWAP
```

-continued

```
OP_ENDIF
OP_DUP OP_0NOTEQUAL
OP_NOTIF
  OP_TOALTSTACK OP_DROP
OP_ELSE
  OP_1 OP_ROT OP_DUP OP_TOALTSTACK OP_TOALTSTACK
       OP_2DUP OP_EQUAL
  OP_NOTIF
    OP_1ADD OP_FROMALTSTACK OP_FROMALTSTACK OP_DUP
    OP_TOALTSTACK OP_ADD OP_TOALTSTACK OP_2DUP OP_EQUAL
      OP_NOTIF
        OP_NOTIF
        OP_ELSE
        OP_ENDIF
      OP_ELSE
        OP_ENDIF
  OP_ELSE
    OP_FROMALTSTACK   OP_FROMALTSTACK   OP_DROP
    OP_TOALTSTACK OP_DROP OP_DROP
  OP_ENDIF
OP_ENDIF
```

The results of executing the above is that the product is left on the Alt stack.

product

In the above code, the purpose of the opening segment is to swap the operands if necessary, so as to ensure that fewer additions need to be performed e.g. 2×3 would require fewer additions and 3×2. This reduces effort and makes the overall code more efficient in terms of time and computational effort. The "swap" segment is:

```
OP_X OP_Y
OP_2DUP OP_GREATERTHAN
OP_NOTIF
  OP_SWAP
OP_ENDIF
```

The purpose of the following code is to provide a counter mechanism:
OP_1    OP_ROT    OP_DUP    OP_TOALTSTACK OP_TOALTSTACK OP_2DUP OP_EQUAL The value of the counter can be used to control the number of times that the addition is performed.

In the above example, the code shown in the dotted-line box is the code for performing the addition. The addition is repeated as shown by the subsequent dotted-line boxes but without the contents repeated for the sake of simplicity and readability. The OP_EQUAL operation at the end of the addition code is used to check whether the addition has now been performed enough times.

The code shown in the double-lined box performs the role of "cleaning up" the stack and returning the result.

Worked Example—Multiplication

In order to further illustrate this technique, we now provide a worked example using two operands, 2 and 3. In the following example, the states of the main stack and Alt stack are shown. The column on the left is the main stack and the right hand column is the Alt Stack.

OP_2 OP_3
OP_2DUP OP_GREATERTHAN

This leaves the state of the stacks as follows (note: the duplication is not shown here for the sake of simplicity and clarity):

| 0 |
| 3 |
| 2 |

OP_NOTIF
    OP_SWAP
OP_ENDIF

| 2 |
| 3 |

OP_DUP OP_0NOTEQUAL

| 1 |
| 2 |
| 3 |

We then execute the "body" of the code if the top stack item is false, using:

OP_NOTIF
  OP_TOALTSTACK OP_DROP
OP_ELSE
  OP_1 OP_ROT OP_DUP OP_TOALTSTACK OP_TOALTSTACK
       OP_2DUP OP_EQUAL

Use of the OP_ROT operation causes the top 3 items to be rotated to the left.

| | 0 | |
|---|---|---|
| | 1 | 3 |
| | 2 | 3 |

OP_NOTIF

OP_1ADD OP_FROMALTSTACK OP_FROMALTSTACK OP_DUP
    OP_TOALTSTACK OP_ADD OP_TOALTSTACK OP_2DUP OP_EQUAL

| | 1 | |
|---|---|---|
| | 2 | 6 |
| | 2 | 3 |

OP_NOTIF

OP_NOTIF

OP_ELSE

OP_ENDIF

OP_ELSE

OP_ENDIF

OP_ELSE

OP_FROMALTSTACK OP_FROMALTSTACK OP_DROP
    OP_TOALTSTACK OP_DROP OP_DROP

| | | |
|---|---|---|
| | | 6 |

Example—Division

In this second example, we implement division instead of multiplication, using the knowledge that division can be performed by repeating a subtraction. We provide a Script-based sequence of operations that emulates the behaviour of division operators. Let X and Y be the values we wish to divide. Written in the syntax of the Script language, the division operator becomes:

```
OP_X OP_Y OP_DUP OP_0NOTEQUAL
OP_NOTIF
   OP_DROP OP_DROP OP_RETURN <INVALID TX>
OP_ELSE
   OP_2DUP OP_LESSTHAN
   OP_IF
      OP_DROP OP_TOALTSTACK OP_0 OP_TOALTSTACK
   OP_ELSE
      OP_1 OP_TOALTSTACK OP_TUCK OP_SUB OP_2DUP
                              OP_GREATERTHANEQUAL
      OP_IF
         OP_FROMALTSTACK OP_SWAP OP_TOALTSTACK
         OP_TOALTSTACK OP_DROP
      OP_ELSE
         OP_FROMALTSTACK OP_1ADD OP_TOALTSTACK
         OP_OVER OP_SUB OP_2DUP OP_GREATERTHANOREQUAL
         OP_IF
            OP_FROMALTSTACK OP_SWAP OP_TOALTSTACK
            OP_TOALTSTACK OP_DROP
         OP_ELSE
```

-continued

```
            OP_FROMALTSTACK OP_1ADD OP_TOALTSTACK
            OP_OVER OP_SUB OP_2DUP
            OP_GREATERTHANOREQUAL
            OP_IF
            OP_ELSE
               OP_ENDIF
            OP_ENDIF
         OP_ENDIF
      OP_ENDIF
   OP_ENDIF
```

The output of the above, as left on the Alt Stack, is:

| | |
|---|---|
| | quotient |
| | remainder |

Worked Example—Division

In this worked example, we divide 11 by 3.

---

OP_11 OP_3 OP_DUP OP_0NOTEQUAL

| 1 |
|---|
| 3 |
| 11 |

OP_NOTIF

OP_DROP OP_DROP OP_RETURN <INVALID TX>

OP_ELSE

OP_2DUP OP_LESSTHAN

| 0 |
|---|
| 3 |
| 11 |

OP_IF

OP_DROP OP_TOALTSTACK OP_0 OP_TOALTSTACK

OP_ELSE

OP_1 OP_TOALTSTACK OP_TUCK OP_SUB OP_2DUP
    OP_GREATERTHANEQUAL

| 0 |   |
|---|---|
| 8 |   |
| 3 | 1 |

OP_IF

OP_SUB OP_FROMALTSTACK OP_SWAP OP_TOALTSTACK
    OP_TOALTSTACK

OP_ELSE

OP_FROMALTSTACK OP_1ADD OP_TOALTSTACK
    OP_OVER OP_SUB OP_2DUP OP_GREATERTHANEQUAL

| 0 |   |
|---|---|
| 5 |   |
| 3 | 2 |

OP_IF

OP_FROMALTSTACK OP_SWAP OP_TOALTSTACK
     OP_TOALTSTACK OP_DROP

OP_ELSE

| 1 |   |
|---|---|
| 2 |   |
| 3 | 3 |

OP_IF

|   | 3 |
|---|---|
|   | 2 |

---

Second Worked Example—Division

In this second worked example, we show how the solution handles division by zero, which can be a source of coding errors in computing implementations due to the inability of a finite machine to represent infinity. In this example, we step through the division of 3 by 0.

OP_3 OP_0 OP_DUP OP_0NOTEQUAL

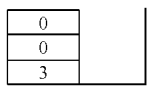

OP_NOTIF
    OP_DROP OP_DROP OP_RETURN <INVALID TX>

Third Worked Example—Division

In the third worked example, we step through the division of 0 by 3.

OP_0 OP_3 OP_DUP OP_0NOTEQUAL

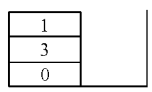

OP_NOTIF
    OP_DROP OP_DROP OP_RETURN <INVALID TX>
OP_ELSE
    OP_2DUP OP_LESSTHAN

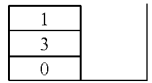

OP_IF
    OP_DROP OP_TOALTSTACK OP_0 OP_TOALTSTACK

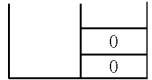

Illustrative Use Case: Blockchain-Implemented Control System

The invention provides techniques for implementing high-level operations in a blockchain script, even when the language of the protocol does not comprise a low-level op-code for that purpose.

This provides a highly versatile arrangement for implementing solutions on a blockchain platform.

To illustrate this, we now present a system that combines multiple inputs to regulate the behaviour of other device(s). As an example, we assume two sensors that provide the following inputs:
(i) the number n of tank containers on board of a ship
(ii) the weight of the containers, assuming the containers weigh ww the exact same.

The device, which in this simple example is a cargo ship, can have two states:
(i) the cargo stays at dock ($state_1$); and
(ii) the cargo leaves the harbour ($state_2$). Initially, the system is in $state_1$.

We define a threshold condition $W_t$. The overall weight W carried on board the cargo controls its behaviour If $W>W_t$, the system is in $state_2$.

FIG. 2 shows the control transaction (Tx) which is submitted to the blockchain. The op_code Pro_MULT represents the high-level arithmetic operation (x) as discussed above. The sensors provide the values n and w to the unlocking script. The corresponding unlocking script which needs to be presented to the locking script is, therefore:

<n><w><sensor1's signature><sensor2's signature>

Blockchain Network

Figure 3:
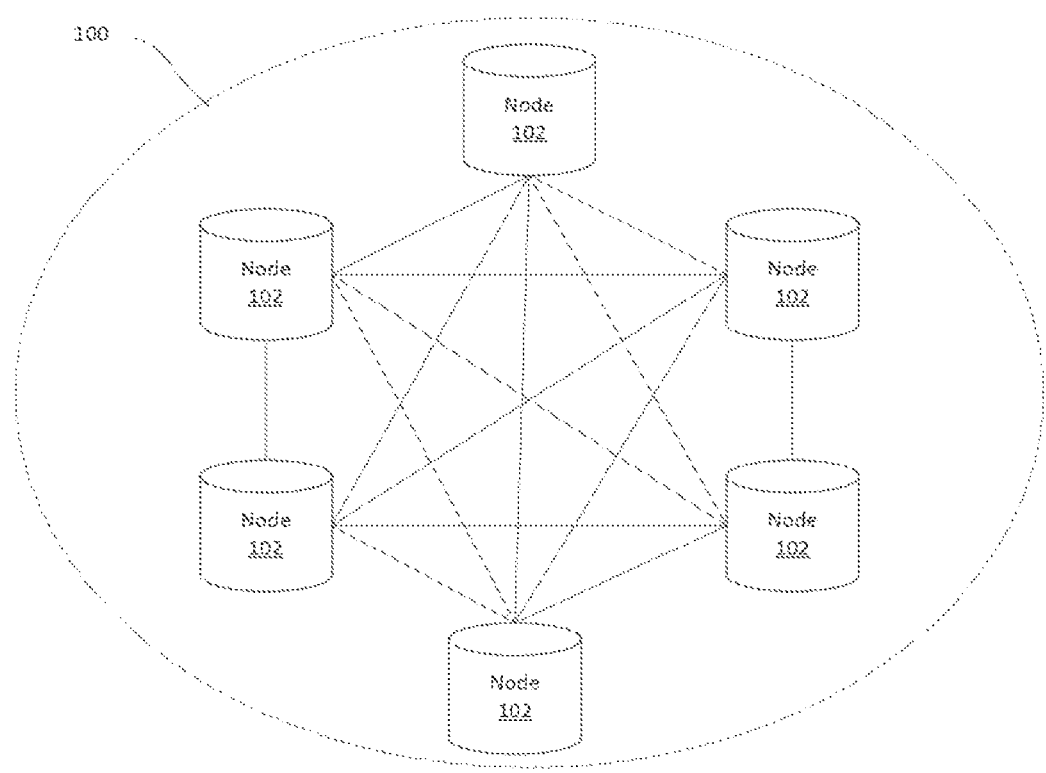
FIG. 3 illustrates an example network associated with a blockchain.

Reference is now made to FIG. 3 which illustrates, in block diagram form, an example network associated with a blockchain, which may be referred to herein as a blockchain network 100, and may be utilised for implementation of the present invention. The blockchain network 100 is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the nodes 102 may be located in geographically dispersed locations.

Nodes 102 maintain a global ledger of all transactions on the blockchain, grouped into blocks, each of which contains a hash of the previous block in the chain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes 102 can fulfil numerous different functions, from network routing to wallet services, to maintain a robust and secure decentralized public ledger. "Full nodes" contain a complete and up-to-date copy of the blockchain, and can therefore verify any transactions (spent or unspent) on the public ledger. "Lightweight nodes" (or SPV) maintain a subset of the blockchain and can verify transactions using a "simplified payment verification" technique. Lightweight nodes only download the headers of blocks, and not the transactions within each block. These nodes therefore rely on peers to verify their transactions. "Mining nodes", which can be full or lightweight nodes, are responsible for validating transactions and creating new blocks on the blockchain. "Wallet nodes", which are typically lightweight nodes, handle wallet services of users. Nodes 102 communicate with each other using a connection-oriented protocol, such as TCP/IP (Transmission Control Protocol).

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method comprising:
storing a plurality of blockchain primitives which have been arranged and/or selected to perform functionality of a high-level scripting language operator, wherein the plurality of blockchain primitives are pre-defined;
retrieving the plurality of blockchain primitives from storage; and
inserting said plurality of blockchain primitives into a script in a blockchain transaction, wherein the plurality of blockchain primitives are accessed, copied, and inserted into the script at execution time, and wherein a number of times the plurality of blockchain primitives are inserted into the script is controlled by an input or signal received from a sensor.

2. The method of claim 1, wherein the method comprises: validating the blockchain transaction and/or submitting it to a blockchain network.

3. The method of claim 2, wherein the method comprises: executing the blockchain transaction.

4. The method of claim 1, wherein each of the plurality of blockchain primitives are selected from a word or instruction set of a scripting language.

5. The method of claim 4, wherein the blockchain primitives are native to the scripting language.

6. The method of claim 4, wherein the scripting language is functionally restricted.

7. A non-transitory computer readable storage medium comprising computer-executable instructions which, when executed, configure a processor to perform the method of claim 1.

8. An electronic device comprising:
an interface device;
a processor coupled to the interface device; and
a memory coupled to the processor, the memory having stored thereon computer executable instructions which, when executed, configure the processor to perform the method of claim 1.

* * * * *